(12) United States Patent
Kameyama et al.

(10) Patent No.: US 6,433,853 B1
(45) Date of Patent: Aug. 13, 2002

(54) CHOLESTERIC LIQUID CRYSTAL LAYER, OPTICAL ELEMENT, LIGHTING DEVICE, AND LIQUID CRYSTAL DISPLAY

(75) Inventors: Tadayuki Kameyama; Hironori Motomura; Naoki Takahashi, all of Osaka (JP)

(73) Assignee: Nitto Denko Corporation, Osaka (JP)

(*) Notice: Subject to any disclaimer, the term of this patent is extended or adjusted under 35 U.S.C. 154(b) by 0 days.

(21) Appl. No.: 09/240,704

(22) Filed: Feb. 2, 1999

(30) Foreign Application Priority Data

Mar. 5, 1998 (JP) .......................................... 10-073183

(51) Int. Cl.$^7$ ........................ G02F 1/1335; G02F 1/137
(52) U.S. Cl. ........................ 349/176; 349/65; 349/118; 349/119; 349/115; 349/98
(58) Field of Search ................................ 349/98, 65, 115, 349/117, 118, 119, 176; 428/1.1, 1.3

(56) References Cited

U.S. PATENT DOCUMENTS

| | | | |
|---|---|---|---|
| 5,506,704 A | * | 4/1996 | Broer et al. .................. 349/98 |
| 5,691,789 A | * | 11/1997 | Li et al. ....................... 349/194 |
| 5,999,243 A | * | 12/1999 | Kameyama et al. .......... 349/98 |
| 6,016,177 A | * | 1/2000 | Motomura et al. .......... 349/175 |
| 6,103,323 A | * | 8/2000 | Motomura et al. ............ 349/98 |
| 6,342,934 B1 | * | 1/2002 | Kameyama et al. .......... 349/117 |

FOREIGN PATENT DOCUMENTS

| | | |
|---|---|---|
| EP | 0 860 717 | 8/1998 |
| WO | 97/19385 | 5/1997 |

OTHER PUBLICATIONS

Patent Abstracts of Japan, vol. 098, No. 006, Apr. 30, 1998.

* cited by examiner

Primary Examiner—William L. Sikes
Assistant Examiner—Tai V. Duong
(74) Attorney, Agent, or Firm—Sughrue Mion, PLLC

(57) ABSTRACT

A cholesteric liquid crystal layer has a helical pitch changing in the thickness direction and shows circular dichroism over a wavelength region having a width of at least 50 nm and including a wavelength of 520 nm, wherein the linearly polarized light obtained through a quarter-wavelength plate has a maximum degree of polarization at a wavelength not longer than 520 nm, or the degree of polarization thereof in a wavelength region on the shorter-wavelength side of 520 nm is higher than that in a wavelength region on the longer-wavelength side of 520 nm. The optical element comprises a multilayer structure composed of the cholesteric liquid crystal layer and at least one optical layer superposed thereon which is a retardation compensating plate, a polarizing plate, a light conductive plate, or a quarter-wavelength plate having an Nz of –0.8 to –2.0 and disposed on the longer-helical pitch side of the liquid crystal layer.

13 Claims, 3 Drawing Sheets

CHOLESTERIC LIQUID CRYSTAL LAYER, OPTICAL ELEMENT, LIGHTING DEVICE, AND LIQUID CRYSTAL DISPLAY

FIELD OF THE INVENTION

The present invention relates to a cholesteric liquid crystal layer suitable for use in, for example, improving the brightness and perceptibility of liquid crystal displays, etc. The present invention further relates to an optical element and a lighting device.

BACKGROUND OF THE INVENTION

An optical element has conventionally been known which has a separation layer for circular light polarization comprising a cholesteric liquid crystal layer showing such circular dichroism that natural light is separated thereby into reflected light comprising circularly polarized light and transmitted light, and in which the circularly polarized light is converted to linearly polarized light with a quarter-wavelength plate. This element has an advantage that since the light emitted by a light source can be supplied as linearly polarized light to a polarizing plate, the absorption loss in the polarizing plate can be reduced to thereby improve the brightness of a liquid crystal display.

However, such conventional optical elements have a problem that the display appears to be colored when viewed from slant directions. It has been proposed to mitigate this problem concerning viewing angle by disposing a quarter-wavelength plate on the longer-helical-pitch side of a cholesteric liquid crystal layer having Grandjean orientation (see PCT Publication WO97/19385). However, this technique is unsuitable for practical use because the improvement in viewing angle characteristics is insufficient for application to liquid crystal displays and the like.

SUMMARY OF THE INVENTION

One object of the present invention is to provide a cholesteric liquid crystal layer which is inhibited from appearing to be colored when viewed from slant directions and thus has excellent viewing angle characteristics, while enabling an improvement in the brightness of liquid crystal displays, etc.

Another object of the present invention is to provide an optical element and a lighting device with each of which liquid crystal displays and the like excellent in brightness and perceptibility can be fabricated.

The present invention provides a cholesteric liquid crystal layer having Grandjean orientation in which the helical pitch changes in the thickness direction, wherein circular dichroism by which natural light is separated into reflected light comprising circularly polarized light and transmitted light is exhibited over a wavelength region having a width of at least 50 nm and including a wavelength of 520 nm, said cholesteric liquid crystal layer showing either such polarization characteristics that when the reflected light or the transmitted light is converted to linearly polarized light through a quarter-wavelength plate, then the linearly polarized light in the visible light region has a maximum value of the degree of polarization at a wavelength of 520 nm or shorter or such polarization characteristics that when the degree of polarization of the linearly polarized light in the visible light region is integrated in the wavelength region where the circular dichroism is exhibited, then the integrated degree of polarization for the region on the shorter-wavelength side of 520 nm is higher than that for the region on the longer-wavelength side of 520 nm.

The present invention further provides an optical element comprising a multilayer structure comprising the cholesteric liquid crystal layer described above and at least one optical layer superposed thereon, the optical layer being a retardation compensating plate, a polarizing plate, a light conductive plate, or a quarter-wavelength plate which comprises one or more retardation layers including a retardation layer having a value of Nz defined by the equation $(n_x-n_z)/(n_x-n_y)=Nz$ of $-0.8$ to $-2.0$, wherein $n_x$ is the maximum in-plane refractive index, $n_y$ is the refractive index in a direction perpendicular to the $n_x$ direction, and $n_z$ is the thickness-direction refractive index.

The present invention furthermore provides a lighting device or liquid crystal display which comprises the cholesteric liquid crystal layer or optical element disposed over a surface light source or on one side of a liquid crystal cell.

This invention still further provides a liquid crystal display comprising the lighting device and a liquid crystal cell disposed on the light emission side thereof.

According to the present invention, a cholesteric liquid crystal layer, an optical element, and a lighting device can be obtained which each is inhibited from appearing to be colored when viewed from slant directions and thus has excellent viewing angle characteristics while enabling an improvement in the brightness of liquid crystal displays, etc. By use of these, a liquid crystal display or the like having excellent brightness and perceptibility can be fabricated. This is attributable to the above-described polarization characteristics of the cholesteric liquid crystal layer.

The present inventors made intensive studies in order to improve the viewing angle characteristics. As a result, it has been found that the colored appearance in viewing from slant directions can be inhibited and viewing angle characteristics are greatly improved not with any conventional cholesteric liquid crystal layer in which the linearly polarized light obtained through a quarter-wavelength plate has a constant degree of polarization throughout the visible wavelength region where circular dichroism is exhibited, but with a cholesteric liquid crystal layer in which the linearly polarized light has different degrees of polarization in the visible wavelength region, specifically, which shows such polarization characteristics that the linearly polarized light has a higher degree of polarization locally or wholly in a range of wavelengths of 520 nm or less, especially in a shorter-wavelength visible region of from 400 to 520 nm, than in a longer-wavelength visible region of especially from520to 700nm. The present invention has been completed based on this finding.

BRIEF DESCRIPTION OF THE DRAWINGS

Each of FIG. 10

[Description of Symbols]

Figure 1:
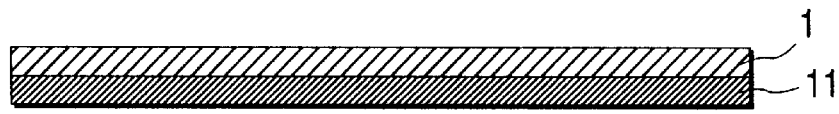
FIG. 1 is a sectional view of an example of the cholesteric liquid crystal layer.

1: Cholesteric liquid crystal layer
12, 13: Cholesteric liquid crystal polymer layer
2: Quarter-wavelength plate
21, 22: Retardation layer
3: Polarizing plate
4: Light conductive plate (surface light source)
41: Reflecting layer
42: Light source
5: Prism array layer
6: Liquid crystal cell (liquid crystal display)
61: Polarizing plate

DETAILED DESCRIPTION OF THE INVENTION

Figure 2:
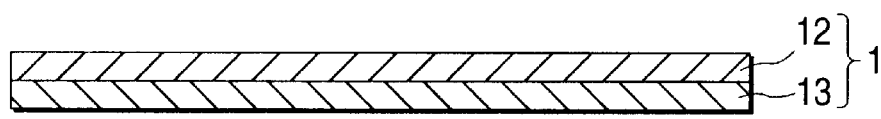
FIG. 2 is a sectional view of another example of the cholesteric liquid crystal layer.

The cholesteric liquid crystal layer of the present invention has Grandjean orientation in which the helical pitch changes in the thickness direction. In the cholesteric liquid crystal layer, circular dichroism by which natural light is separated into reflected light comprising circularly polarized light and transmitted light is exhibited over a wavelength region having a width of at least 50 nm and including a wavelength of 520 nm. The cholesteric liquid crystal layer shows either such polarization characteristics that when the reflected light or the transmitted light is converted to linearly polarized light through a quarter-wavelength plate, then the linearly polarized light in the visible light region has a maximum value of the degree of polarization at a wavelength of 520 nm or shorter or such polarization characteristics that when the degree of polarization of the linearly polarized light in the visible light region is integrated in the wavelength region where the circular dichroism is exhibited, then the integrated degree of polarization for the region on the shorter-wavelength side of 520 nm is higher than that for the region on the longer-wavelength side of 520 nm. Examples of this cholesteric liquid crystal layer are shown in FIGS. 1 and 2, wherein numeral 1 denotes a cholesteric liquid crystal layer, 11 a substrate, and 12 and 13 each a cholesteric liquid crystal polymer layer.

For forming the cholesteric liquid crystal layer, an appropriate cholesteric liquid crystal can be used such as, e.g., a low or high molecular compound showing the property of having Grandjean orientation. However, a cholesteric liquid crystal polymer can be advantageously used from the standpoint of suitability for practical use, e.g., handleability. Usable cholesteric liquid crystal polymers are not particularly limited, and a suitable one or a suitable combination of two or more thereof can be used.

Examples of the cholesteric liquid crystal polymers include main-chain type or side-chain type cholesteric liquid crystal polymers in which conjugated linear groups (mesogens) which impart the property of undergoing liquid crystalline orientation have been incorporated in the main chain or side chains, respectively. Preferably used from the standpoints of handleability, orientation stability in practical temperatures, etc. are cholesteric liquid crystal polymers having a glass transition temperature of from 30 to 150° C.

Specific examples of the main-chain type cholesteric liquid crystal polymers include polymers having a structure in which mesogen groups each comprising, e.g., a para-substituted cyclic compound have been bonded optionally through a spacer part for imparting flexibility. Such polymers include polyesters, polyamides, polycarbonates, and polyesterimides.

Specific examples of the side-chain type cholesteric liquid crystal polymers include: those comprising a backbone such as a polyacrylate, polymethacrylate, polysiloxane, or polymalonate and having side chains each comprising a low molecular liquid crystal compound (mesogen part) made up of, e.g., para-substituted cyclic compounds bonded optionally through a spacer part comprising conjugated groups; nematic liquid crystal polymers containing a low molecular chiral reagent; liquid crystal polymers containing an incorporated chiral ingredient; and mixtures of nematic and cholesteric liquid crystal polymers.

As described above, polymers having para-substituted cyclic compounds which impart the property of undergoing nematic orientation and which comprise, e.g., para-substituted aromatic or cyclohexyl ring units, such as azomethine, azo, azoxy, ester, biphenyl, phenylcyclohexane, or bicyclohexane compounds, may also be made to have the property of undergoing cholesteric orientation by, for example, incorporating an appropriate chiral ingredient or low-molecular chiral reagent each comprising, e.g., a compound having an asymmetric carbon atom (see, for example, JP-A-55-21479 (the term "JP-A" as used herein means an "unexamined published Japanese patent application") and U.S. Pat. No. 5,332,522). In the para-substituted cyclic compounds, each terminal substituent at the para position may be an appropriate group such as, e.g., a cyano, alkyl, or alkoxyl group.

Examples of the spacer part include flexible chains such as polymethylene chains —$(CH_2)_n$— and polyoxymethylene chains —$(CH_2CH_2O)_m$—. The number of repetitions of the structural unit constituting the spacer part is suitably determined by the chemical structure of the mesogen parts, etc. In general, n in the polymethylene chains is from 0 to 20, preferably from 2 to 12, while m in the polyoxymethylene chains is from 0 to 10, preferably from 1 to 3.

A cholesteric liquid crystal layer can be formed, for example, by a method comprising spreading a thermotropic liquid crystal polymer on an oriented film, heating the spread polymer at a temperature which is not lower than the glass transition temperature but is below the isotropic phase transition temperature thereof and at which the polymer shows a liquid crystal phase, and then cooling the liquid crystal polymer to a temperature lower than the glass transition temperature thereof while keeping the polymer in Grandjean orientation to thereby bring the liquid crystal polymer into a glassy state and thus form a solidified layer in which the orientation has been fixed.

By bringing a cholesteric liquid crystal polymer into Grandjean orientation, the polymer comes to show such circular dichroism that natural light is separated thereby into reflected light comprising circularly polarized light and transmitted light. The wavelength region over which the circular dichroism (selective reflection) is shown is determined by the helical pitch of Grandjean orientation, etc. Preferred from the standpoints of wideness of that wavelength region, etc. are cholesteric liquid crystal polymers having a large difference in the degree of birefringence.

For spreading a cholesteric liquid crystal polymer in the method described above, the polymer may be thermally melted and then spread or may be spread as a solution in a solvent. An appropriate solvent may be used for this purpose, such as, e.g., methylene chloride, cyclohexanone, trichloroethylene, tetrachloroethylene, N-methylpyrrolidone, or tetrahydrofuran.

The spreading of a liquefied cholesteric liquid crystal polymer can be conducted by an appropriate method such as spin coating, roll coating, flow coating, printing, dip coating, casting, bar coating, or gravure printing. If desired and necessary, the spreading may be conducted in such a manner that liquid crystal polymer layers are superposed on each other through an oriented film. Various additives such as, e.g., a stabilizer, plasticizer, and metal may be incorporated, according to need, into the liquid comprising a liquid crystal polymer to be spread.

As the oriented film for bringing a cholesteric liquid crystal into Grandjean orientation, use may be made of an appropriate oriented film for use with conventional low-molecular liquid crystals. Examples thereof include a film obtained by rubbing a thin film of a polyimide, poly(vinyl alcohol), or the like with a rayon cloth or the like, a thin film formed by the oblique vapor evaporation of $SiO_2$, etc., and an oriented film consisting of a stretched film, etc.

The substrate on which the layer of a spread cholesteric liquid crystal is supported is not particularly limited in its kind, and an appropriate substrate having a single- or multilayer structure can be used. Examples thereof include: films of polymers such as olefin polymers, e.g., polyethylene, polypropylene, polyolefins having a norbornene structure, and ethylene/propylene copolymers, polyester polymers, e.g., poly(ethylene terephthalate) and poly(ethylene naphthalate), cellulosic polymers, e.g., cellulose diacetate and cellulose triacetate, acrylic polymers, e.g., poly(methyl methacrylate), amide polymers, e.g., nylons and aromatic polyamides, imide polymers, sulfone polymers, polyethersulfone polymers, polyetheretherketone polymers, poly(phenylene sulfide) polymers, vinyl alcohol polymers, vinyl chloride polymers, vinylidene chloride polymers, vinyl butyral polymers, carbonate polymers, arylate polymers, polyoxymethylene polymers, and styrene polymers; and glass plates.

In the case where a cholesteric liquid crystal layer formed on a supporting substrate is used in this state united with the substrate, the substrate is generally preferably a transparent one which has excellent isotropy and is reduced in birefringence as much as possible, such as a cellulose triacetate film or a glass plate, from the standpoints of viewing angle characteristics, etc. Although the substrate may have an appropriate thickness, the thickness thereof is generally 500 $\mu$m or smaller, preferably from 5 to 200 $\mu$m, more preferably from 10 to 100 $\mu$m, from the standpoints of light transmittance, strength, etc.

The oriented film shown above as an example of the oriented film can be obtained, for example, by forming a single- or multilayered film by an appropriate technique, e.g., casting, extrusion, or coextrusion of two or more layers, and then stretching the film in an appropriate manner, e.g., uni- or biaxially. Alternatively, the oriented film can be obtained through molecular orientation by crystallization. These oriented films also can be used as the substrate.

The thickness of the cholesteric liquid crystal layer formed on an oriented film is generally 50 $\mu$m or smaller, preferably from 0.5 to 20 $\mu$m, more preferably from 1 to 10 $\mu$m, from the standpoints of preventing uneven orientation or a decrease in transmittance and of the wavelength region where circular dichroism is exhibited. The cholesteric liquid crystal layer according to the present invention may have a multilayer structure comprising two or more superposed layers, such as that shown in FIG. 2, which comprises cholesteric liquid crystal polymer layers 12 and 13. The formation of a multilayer structure composed of two or more superposed layers is advantageous from the standpoints of widening the wavelength region where circular dichroism is exhibited and of coping with the wavelength shift of oblique incident light, i.e., improving viewing angle characteristics, etc. In this case, it is preferred to employ a combination of superposed layers which differ from each other in central wavelength for circular dichroism.

The reason for the above is as follows. In the case of a single layer consisting of a cholesteric liquid crystal, the wavelength region where circular dichroism is shown is generally limited. Although in some cases the width of that wavelength region may be as large as about 100 nm, even this wavelength region does not cover the whole visible light region desired in applications such as, e.g., liquid crystal displays. In such a case, the wavelength region where circular dichroism is shown can be widened by superposing cholesteric liquid crystal polymer layers which differ from each other in central wavelength for circular dichroism.

For example, a cholesteric liquid crystal layer capable of covering the visible light region can be efficiently formed by superposing from two to six cholesteric liquid crystal layers which have central wavelengths for circular dichroism ranging from 300 to 900 nm in such a manner that layers which reflect circularly polarized light of the same polarization direction and differ from each other in central wavelength for circular dichroism are used in combination. The aforementioned use of a combination of layers which reflect circularly polarized light of the same polarization direction is intended to enable the circularly polarized lights reflected respectively by the layers to have the same phase state and prevent the wavelength regions from differing in polarization state to thereby increase the amount of polarized light that can be utilized.

Although suitable cholesteric liquid crystals may be used as described above, it is preferred to use liquid crystal layers having a larger difference in the degree of birefringence because such liquid crystal layers have a wider wavelength region where circular dichroism is exhibited and are hence advantageous from the standpoints of room for a reduction in the number of layers and for wavelength shifting as a result of a viewing angle increase, etc. From the standpoint of diminishing the dependence of color on viewing angle, it is preferred to superpose cholesteric liquid crystal layers in order of their increasing central wavelength for circular dichroism.

A cholesteric liquid crystal layer having the Grandjean orientation described above shows different circular dichroism wavelength characteristics depending on its helical pitch. In the cholesteric liquid crystal layer according to the present invention, the helical pitch changes in the thickness direction and the circular dichroism is exhibited over a wavelength region having a width of at least 50 nm and including a wavelength of 520 nm. A cholesteric liquid crystal layer having Grandjean orientation in which the helical pitch changes in the thickness direction has an advantage that it has a wide wavelength region where circular dichroism is exhibited.

The cholesteric liquid crystal layer in which the helical pitch changes in the thickness direction can be produced, for example, by preparing two or more layers of an aligned cholesteric liquid crystal polymer and bonding a given number of these layers by thermo compression bonding. For the thermo compression bonding, a suitable method can be used such as, e.g., a method in which an appropriate heating/pressing means, e.g., a roll laminator, is used to heat cholesteric liquid crystal layers to a temperature not lower than the glass transition temperature but below the isotropic phase transition temperature thereof and compression-bond these layers together.

In the case of solidified liquid crystal polymer layers each united with a substrate, a cholesteric liquid crystal layer in which the helical pitch changes in the thickness direction can be obtained by superposing the solidified layers in the above-described manner so that these layers are in close contact with each other. Alternatively, the cholesteric liquid crystal layer can be obtained by a method which comprises stripping one of the substrates for two superposed cholesteric liquid crystal polymer layers to expose the corresponding cholesteric liquid crystal polymer layer, superposing another solidified liquid crystal polymer layer on the exposed side in the same manner as the above, and optionally repeating the above procedure.

The cholesteric liquid crystal polymer layer formed on a substrate may be peeled from the substrate and used as a liquid crystal polymer film. This liquid crystal polymer film may be subjected to the superposition described above, whereby a cholesteric liquid crystal layer in which the helical pitch changes in the thickness direction can be obtained.

The above-described cholesteric liquid crystal layer in which the helical pitch changes in the thickness direction may be one which has a continuous wavelength region where circular dichroism is exhibited or one which has discontinuous wavelength regions where circular dichroism is exhibited. Preferred from the standpoints of preventing rainbowy unevenness is the cholesteric liquid crystal layer which has a continuous wavelength region where circular dichroism is exhibited. This cholesteric liquid crystal layer can be produced, for example, by a method in which a multilayer structure comprising superposed cholesteric liquid crystal polymer layers formed, e.g., by the thermocompression bonding technique described above is heated to a temperature not lower than the glass transition temperature but below the isotropic phase transition temperature thereof to thereby form at each interface a layer in which the cholesteric liquid crystal polymers respectively constituting the upper and the lower layers have been mixed with each other.

The above cholesteric liquid crystal polymer layer comprising a mixture of the cholesteric liquid crystal polymers of the upper and the lower layers differs in helical pitch from each of the upper and lower layers to thereby form a cholesteric liquid crystal layer in which the helical pitch changes in multiple stages in the thickness direction. In general, the helical pitch thereof is intermediate between those of the upper and lower cholesteric liquid crystal polymer layers, whereby the interfacial layer together with the upper and lower layers forms an area which has a continuous region where circular dichroism is exhibited.

Consequently, when a combination of upper and lower, cholesteric liquid crystal polymer layers whose wavelength regions where circular dichroism is exhibited do not overlap with each other, i.e., a combination having wavelength regions in which circular dichroism is exhibited and between which a missing region is present due to discontinuity, is used, then the cholesteric liquid crystal polymer layer formed by the mixing of the upper and lower layers compensates for the missing region to thereby make those circular-dichroism wavelength regions continuous.

Therefore, two cholesteric liquid crystal polymer layers which, for example, have circular-dichroism wavelength regions of up to 500 nm and of from 600 nm to a longer wavelength, respectively, can be used to obtain a cholesteric liquid crystal layer which exhibits circular dichroism also with respect to light in the wavelength region of from 500 to 600 nm, which corresponds to the gap between those discontinued wavelength regions. This means that a cholesteric liquid crystal layer having a wide wavelength region where circular dichroism is exhibited can be formed with a smaller number of-superposed cholesteric liquid crystal polymer layers.

As described above, a structure in which the helical pitch changes in the thickness direction is also effective in, e.g., widening the wavelength region where circular dichroism is exhibited. In this case, however, the individual cholesteric liquid crystal layers having different helical pitches are preferably arranged in the thickness direction in order of their increasing or decreasing central wavelength for circular dichroism as described above, from the standpoints of viewing angle characteristics, etc.

In the cholesteric liquid crystal layer according to the present invention, the helical pitch changes preferably throughout the whole thickness from the standpoints of the wavelength region where circular dichroism is exhibited, viewing angle characteristics, etc. However, the cholesteric liquid crystal layer may have a part where the helical pitch changes in the thickness direction, like a constitution comprising the above-described multilayered cholesteric liquid crystal structure wherein the helical pitch changes in the thickness direction and, bonded thereto through an adhesive layer according to need, a cholesteric liquid crystal layer optionally formed on a supporting substrate and having a different wavelength region where circular dichroism is exhibited.

From the standpoints of improving brightness, etc., a preferred cholesteric liquid crystal layer according to the present invention especially for use in liquid crystal displays and the like is one in which the wavelength region where circular dichroism is exhibited has a width of at least 100 nm and includes a wavelength of 520 nm. The circular-dichroism wavelength region more preferably includes a visible light region of from 400 to 700 nm, and most preferably includes the whole visible light region.

Besides the properties described above, the cholesteric liquid crystal layer according to the present invention shows such polarization characteristics that when the reflected light or the transmitted light is converted to linearly polarized light through a quarter-wavelength plate, then the linearly polarized light in the visible light region has a maximum value of the degree of polarization at a wavelength of 520 nm or shorter, or shows such polarization characteristics that when the degree of polarization of the linearly polarized light in the visible light region is integrated in the wavelength region where the circular dichroism is exhibited, then the integrated degree of polarization for the region on the shorter-wavelength side of 520 nm is higher than that for the region on the longer-wavelength side of 520 nm. As a result, the cholesteric liquid crystal layer can be inhibited from having a colored appearance when viewed from slant directions and can hence have excellent viewing angle characteristics.

The above property means that in the visible light region, the degree of polarization of the linearly polarized light having wavelengths not longer than 520 nm is higher either locally or in terms of integrated value in a given wavelength region than that of the linearly polarized light on the longer-wavelength side. Consequently, the above polarization characteristics can be judged based on a comparison between part or all of a monochromatic or shorter-wavelength visible region of from 520 nm to a shorter wavelength and part or all of a monochromatic or longer-wavelength visible region of more than 520 nm.

A cholesteric liquid crystal layer having the polarization characteristics described above can be formed, for example, by a method in which the helical pitch in Grandjean orientation is controlled. From the standpoints of viewing angle characteristics, etc., the polarization characteristics are preferably such that the degree of polarization in a shorter-wavelength visible region of 520 nm or less, especially from 400 to 520 nm, is higher by at least 2%, preferably at least 5%, more preferably from 10 to 40%, than that in a longer-wavelength visible region over 520 nm, especially from 520 to 700 nm. In particular, in the case where the degree of polarization in the shorter-wavelength visible region of 520 nm or less is given in terms of maximum value, it is preferably 80% or higher, more preferably from 82 to 96%, most preferably from 84 to 94%.

The cholesteric liquid crystal layer according to the present invention can be advantageously used, for example, in the fabrication of liquid crystal displays. In this case, the cholesteric liquid crystal layer can be used also as an optical element comprising the layer and one or more optical layers superposed thereon. Examples of this optical element are shown in FIGS. 3 and 4, wherein numerals 2 and 3 each denotes an optical layer, 2 a quarter-wavelength plate, and 3 a polarizing plate.

Suitable optical layers can be used, such as, e.g., the quarter-wavelength plate mentioned above, a polarizing plate, a light conductive plate for lighting device fabrication, and a retardation compensating plate for liquid crystal display fabrication, etc. In the case of using a quarter-wavelength plate, it can be disposed on the longer-helical pitch side of the cholesteric liquid crystal layer. However, there is a tendency that the closer to the quarter-wavelength plate within the cholesteric liquid crystal layer, the higher the degree of polarization of the light. Consequently, from the standpoints of viewing angle characteristics, etc., the quarter-wavelength plate is preferably disposed on the shorter-helical pitch side of the cholesteric liquid crystal layer.

Figure 3:
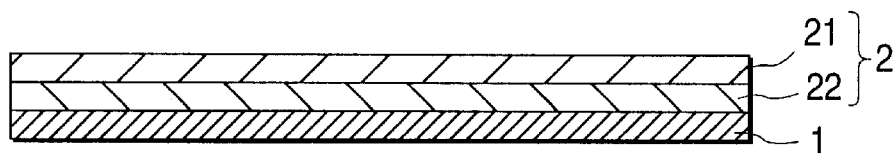
FIG. 3 is a sectional view of an example of the optical element.
Figure 4:
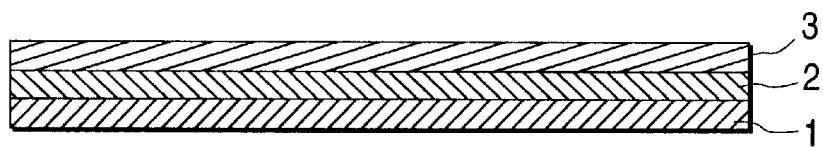
FIG. 4 is a sectional view of another example of the optical element.

As shown in FIGS. 3 and 4, the above quarter-wavelength plate is intended to convert the circularly polarized light which has been reflected by the cholesteric liquid crystal layer 1 or has passed through the liquid crystal layer 1 into linearly polarized light. The quarter-wavelength plate may consist of one or more retardation layers 21 and 22 as shown in FIG. 3.

For use in the visible light region, the quarter-wavelength plate (retardation plate) is preferably one having a frontal retardation of from 100 to 180 nm from the standpoints of the effect of forming linearly polarized light, compensation of the color change caused by oblique transmitted light, etc. Namely, it is preferred to use a quarter-wavelength plate which satisfies the equation $(n_x-n_y)d=\Delta nd=100$ to 180 nm, wherein $n_x$ is the maximum in-plane refractive index, $n_y$ is the refractive index in a direction perpendicular to the $n_x$ direction, $n_z$ is the refractive index in the thickness direction, and d is the thickness.

If desired and necessary, a retardation layer may be used together with the above-described retardation layer functioning as a quarter-wavelength plate. This optional retardation layer is intended to be used for compensation. For example, the layer serves to modify the light which has obliquely passed through the retardation layer functioning as a quarter-wavelength plate so that the light comes to have a color balance as close as possible to that of the vertically transmitted light to thereby enable the whole transmitted light to be seen, through a polarizing plate, as light having an intermediate color of a reduced color density. Specifically, a retardation layer having a frontal retardation ($\Delta nd$) of from 100 to 720 nm is preferably used.

From the standpoints of improving viewing angle characteristics by compensating for the color change with changing viewing angle, etc., the above quarter-wavelength plate for use in the present invention comprises one or more retardation layers having a value of Nz defined by the above-described equation $(n_x-n_z)/(n_x-n_y)=Nz$ of $-0.8$ to $-2.0$. If retardation layers having an Nz outside the above range, therefore having around 1 as conventional ones, are used, poor viewing angle characteristics result.

The retardation layer may be made of any material. It is however preferred to use a material which has excellent transparency, in particular a light transmittance of 80% or higher, and gives an even retardation. In general, a stretched film made of any of the polymers enumerated hereinabove with regard to the substrate described above or made of a liquid crystal polymer is used. Especially preferably used is a liquid crystal polymer of the twisted orientation type or the like.

The above-described properties such as $\Delta nd$ and Nz can be controlled, for example, by modifying stretching conditions. In the case where the thickness-direction refractive index should be controlled, this can be accomplished, for example, by bonding a polymer film to a heat-shrinkable film and stretching the same. The thickness of the retardation layer, based on a single-layer constitution, is generally from 5 to 500 $\mu$m, preferably from 10 to 300 $\mu$m, more preferably from 20 to 200 $\mu$m. However, the thickness thereof should not be construed as being limited thereto.

In the case where retardation layers for, e.g., a quarter-wavelength plate are formed from a liquid crystal polymer, they can be obtained so as to have an appropriate constitution, e.g., as a film of an aligned liquid crystal polymer or as a layer of an oriented liquid crystal polymer supported on a transparent substrate, as in the case of the cholesteric liquid crystal layer described above. In the case of using a liquid crystal polymer, the desired retardation layers can be obtained without stretching.

The quarter-wavelength plate may consist of only one retardation layer as stated hereinabove, or may consist of a multilayer structure comprising two or more retardation layers which differ in retardation. The formation of a multilayer structure comprising retardation layers which differ in retardation is effective, for example, in widening the wavelength region in which the retardation plate functions as the desired quarter-wavelength plate or as a compensating plate, etc.

On the other hand, the retardation compensating plate is intended to be used, for example, for compensating for the wavelength dependence of birefringence, etc. to thereby improve perceptibility. A suitable retardation compensating plate can be used according to wavelength regions, etc. It may consist of a single retardation layer or have a multilayer structure comprising two or more retardation layers superposed on each other. It can be obtained, for example, as a stretched film or liquid crystal polymer layer as shown as an example of the quarter-wavelength plate described above.

A preferred optical element from the standpoints of the effect of improving brightness, etc. transmits linearly polarized light having a given axis of polarization and reflects the other lights. Use may be made of an optical element having a constitution comprising a quarter-wavelength plate 2 and a polarizing plate 3 disposed thereon as shown in FIG. 4. This optical element as such can be applied to liquid crystal cells without using another polarizing plate.

A suitable polarizing plate can be used such as, e.g., an absorption type polarizing plate containing a dichroic substance or a polarizing plate comprising an oriented polyene film optionally having a transparent protective layer. Examples of the absorption type polarizing plate include a film obtained by adsorbing iodine or a dichroic substance, e.g., a dichroic dye, onto a hydrophilic polymer film, such as a poly(vinyl alcohol) film, a film of poly(vinyl alcohol) which has undergone partial conversion into formal, or a film of a partially saponified ethylene/vinyl acetate copolymer, and then stretching the film. Examples of the oriented polyene film include a film of dehydrated poly (vinyl alcohol) and a film of dehydrochlorinated poly (vinyl chloride). Although the polarizing plate usually has a thickness of from 5 to 80 $\mu$m, its thickness should not be construed as being limited thereto.

For fabricating a liquid crystal display, a polarizing plate having a high degree of polarization is preferably used such as, e.g., an absorption type polarizing plate containing a dichroic substance, from the standpoints of, e.g., attaining bright display, i.e., obtaining display having a satisfactory contrast by allowing the light which has been highly linearly polarized with a quarter-wavelength plate to pass through the polarizing plate while minimizing the absorption loss and thus causing the highly linearly polarized light to enter a liquid crystal cell. Especially preferred among such polarizing plates are absorption type polarizing plates containing a dichroic substance and having a light transmittance of 40% or higher and a degree of polarization of 95.0% or higher, in particular 99% or higher.

The transparent protective layer is a layer formed for protection especially in the case of a polarizing plate having poor water resistance like the polarizing plate containing a dichroic substance. The protective layer may be formed by an appropriate method such as, e.g., plastic coating or film laminating. In the case where the protective layer is formed using a separately prepared film or the like, it is preferred to obtain a united structure through laminating with an adhesive layer from the standpoints of reflection loss prevention, etc. Although the transparent protective layer may have an appropriate thickness, the thickness thereof is generally 1 mm or smaller, preferably 500 $\mu$m or smaller, more preferably from 1 to 300 $\mu$m. The plastic may be an appropriate one, examples of which include those enumerated hereinabove with regard to the substrate, etc.

The transparent resin layer may be formed so as to have a finely roughened surface structure, for example, by incorporating fine particles thereinto. The fine particles are ones which have an average particle diameter of, e.g., from 0.5 to 5 $\mu$m and are transparent in the transparent resin layer. Examples thereof include inorganic fine particles which may be electroconductive such as silica, alumina, titania, zirconia, tin oxide, indium oxide, cadmium oxide, and antimony oxide and organic fine particles such as particles of crosslinked or uncrosslinked polymers. In general, the content of such fine particles is from 2 to 25% by weight, preferably from 5 to 20% by weight.

When a polarizing plate is disposed on the upper side of a quarter-wavelength plate, the disposition angle of the polarizing plate with respect to the quarter-wavelength plate can be suitably determined according to the retardation characteristics of the quarter-wavelength plate, the properties of the circularlypolarized light entering the same, etc. However, from the standpoints of improving the efficiency of light utilization, etc., the polarizing plate is preferably disposed so that the transmission axis of the polarizing plate becomes as parallel as possible to the direction of polarization (oscillation) of the light which has been linearly polarized with the quarter-wavelength plate.

In the optical element having a quarter-wavelength plate according to the present invention, the circularly polarized light and elliptically polarized light which have passed through or have been reflected by the cholesteric liquid crystal layer, which functions to separate natural light or light from a light source into left and right circularly polarized lights through reflection and transmission, are converted with the quarter-wavelength plate into linearly polarized light, which is fed to the polarizing plate.

Figure 5:
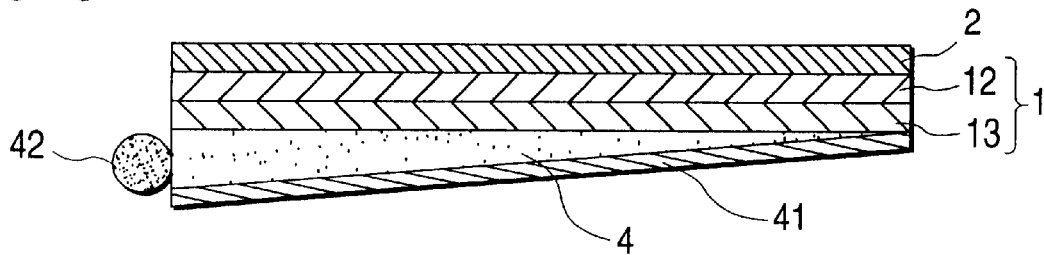
FIG. 5 is a sectional view of an example of the lighting device.
Figure 6:
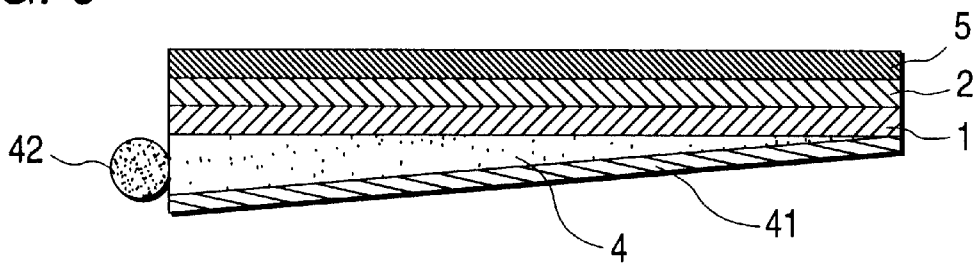
FIG. 6 is a sectional view of another example of the lighting device.

Consequently, when this cholesteric liquid crystal layer or optical element is disposed on an appropriate surface light source 4, e.g., a side light type light conductive plate or an EL lamp, it is possible to fabricate an lighting device suitable for use as, e.g., the back light of a liquid crystal display, as shown in FIGS. 5 and 6. The surface light source shown in each figure comprises a light conductive plate 4 having a reflecting layer 41 on the back surface thereof and a light source 42 disposed at the side of the plate 4.

In the lighting devices shown in FIGS. 5 and 6, the light from the light source 42 strikes on the corresponding side of the light conductive plate 4 and is subsequently reflected by the back surface of the light conductive plate 4, etc. and then emitted from the front surface of the light conductive plate. The emitted light passes through the cholesteric liquid crystal layer 1 disposed on the front side of the light conductive plate to thereby become desirable circularly polarized light (vertical) and elliptically polarized light (oblique). These lights are converted to linearly polarized light with the quarter-wavelength plate 2 and then enter a polarizing plate 3.

On the other hand, the light which has been reflected as undesirable circularly polarized light by the cholesteric liquid crystal layer 1 reenters the light conductive plate 4, is reflected by the reflecting layer 41 disposed on the back surface of the plate 4, and reenters as return light into the cholesteric liquid crystal layer 1. Part of the return light passes through the cholesteric liquid crystal layer. Consequently, the light reflected by the cholesteric liquid crystal layer is confined between the cholesteric liquid crystal layer and the light conductive plate and repeatedly reflected therebetween until it passes through the cholesteric liquid crystal layer.

As stated above, the reflected light returned to the side light type light conductive plate is confined between the cholesteric liquid crystal layer and the reflecting layer of the light conductive plate and repeatedly reflected therebetween, during which the light gradually passes through the cholesteric liquid crystal layer. Namely, the light which thus passes through the liquid crystal layer is emitted together with the initially transmitted part of the incident light from the light source. Thus, the amount of unutilized light attributable to reflection loss is reduced.

On the other hand, the light emitted from the cholesteric liquid crystal layer is converted with the quarter-wavelength plate into linearly polarized light or into elliptically polarized light having a large proportion of linearly polarized light components. This converted light is hardly absorbed by the polarizing plate and passes therethrough, when the direction of the linear polarization thereof coincides with the transmission axis of the polarizing plate. Thus, the amount of unutilized light attributable to absorption loss is also reduced. As a result, the light which has conventionally been unutilized due to reflection and absorption losses can be effectively utilized and the efficiency of light utilization can be improved. Consequently, a side light type light conductive plate is preferred as the surface light source.

The light conductive plate may be an appropriate one which has such a constitution that light is emitted from its front side via the back surface, etc. Preferably used is a light conductive plate which is capable of efficiently emitting light without absorption. An example thereof is the known side light type back light for use in liquid crystal displays which comprises a light conductive plate and, disposed at the side thereof, a light source such as a linear light source, e.g., a (cold or hot) cathode tube or a light-emitting diode, and has such a constitution that the light transmitted by the light conductive plate is emitted from one side of the plate through diffusion, reflection, diffraction, interference, etc.

The above-described light conductive plate in which the light transmitted therein is emitted from one side thereof can, for example, be obtained so as to have a constitution having a diffuser disposed in the form of dots or stripes on the light emission side or back side of a transparent or translucent resin plate, or to have a constitution in which a roughened structure especially in the form of a fine prism array has been imparted to the back side of the resin plate.

The reflecting layer 41 disposed on the back side of the light conductive plate not only serves to reflect return light from the cholesteric liquid crystal layer, but also is effective, for example, in preventing incident light from the light source from leaking out through the back side of the light conductive plate to thereby eliminate reflection loss almost completely. The reflecting layer can be one having an appropriate reflecting surface, such as, e.g., a diffusion reflection layer represented, e.g., by one having a roughened surface or a mirror reflection layer represented by one having a metal surface such as a vapor-deposited layer of aluminum, silver, etc., a resin plate having the vapor-deposited layer, or a metal foil.

In fabricating an lighting device, a suitable combination of a light conductive plate 4 with one or more auxiliary means disposed in predetermined positions, e.g., on the upper or lower surface of the light conductive plate 4 or at the side thereof, is formed as shown in FIG. 6. Examples of such auxiliary means include a prism array layer 5 which comprises a prism sheet, etc. and is used for controlling the direction of light emission, a diffusing plate for obtaining even illumination, and a light source holder for introducing the light emitted by a linear light source into the side of the light conductive plate. Consequently, the above-described light conductive plate, prism array layer, and diffusing plate and the like are included in examples of the optical layers which can be superposed on the cholesteric liquid crystal layer to fabricate an optical element.

The prism array layer or diffusing plate disposed on the front side (light emission side) of the light conductive plate or the dots or the like imparted to the light conductive plate can function also as a means of eliminating a polarized state based on diffusion effect, etc. In the case where two or more prism array layers are used, it is preferred to dispose there prism array layers so that the prism arrays in the individual layers are oriented in different directions meeting each other at right or other angles to thereby eliminate optical anisotropy.

The layers constituting the cholesteric liquid crystal layer, optical element, or lighting device in the present invention, e.g., a cholesteric liquid crystal polymer layer, a quarter-wavelength plate, a polarizing plate, and a light conductive plate, can be superposed and united with each other through an adhesive if desired and necessary. This superposition and uniting of constituent layers is effective, for example, in inhibiting reflection loss at each interface and preventing foreign matters, etc. from coming into each interface to thereby avoid a decrease in, e.g., display quality, and also in preventing the compensation efficiency, the efficiency of polarized-light conversion, etc. from decreasing due to the position shifting of members of the optical system. Furthermore, this method in which constituent layers are bonded together beforehand has advantages over the sequential bonding in assembly lines, for example, that highly reliable optical elements of stable quality are obtainable. Consequently, also in the case where the cholesteric liquid crystal layer, quarter-wavelength plate, polarizing plate, light conductive plate, or the like is constituted of two or more layers, it is preferred to tightly unite these layers with each other through an adhesive layer, etc.

A suitable adhesive or the like can be used for the superposition and uniting. However, a pressure-sensitive adhesive having excellent stress-relaxing properties is especially preferably used, for example, because it inhibits the cholesteric liquid crystal layer, quarter-wavelength plate, polarizing plate, etc. from suffering a stress due to heat emitted, e.g., by a light source and thus prevents these members from undergoing a change in refractive index caused by a photoelastic deformation. Namely, use of the pressure-sensitive adhesive enables the fabrication of liquid crystal displays which are bright and excellent in perceptibility and reliability in display quality.

For forming a pressure-sensitive adhesive layer, a transparent pressure-sensitive adhesive can be used which comprises an appropriate polymer such as, e.g., an acrylic polymer, silicone polymer, polyester, polyurethane, polyether, or synthetic rubber. Especially preferred among these is an acrylic pressure-sensitive adhesive from the standpoints of optical transparency, pressure-sensitive adhesive properties, weatherability, etc. From the standpoint of relaxing an internal stress thermally imposed on a multilayer structure and thus preventing the multilayer structure from suffering a photoelastic deformation and from other standpoints, a preferred pressure-sensitive adhesive layer has a modulus of relaxation elasticity of from $2 \times 10^5$ to $1 \times 10^7$ dyne/cm$^2$, especially from $2 \times 10^6$ to $8 \times 10^6$ dyne/cm$^2$.

The thickness of the pressure-sensitive adhesive layer may be suitably determined. From the standpoints of adhesion strength, thickness reduction, etc., the thickness thereof is generally from 1 to 500 µm, preferably from 2 to 200 µm, more preferably from 5 to 100 µm. If desired and necessary, appropriate additives can be incorporated into the pressure-sensitive adhesive layer. Examples of the additives include tackifiers such as petroleum resins, rosin resins, terpene resins, coumarone-indene resins, phenolic resins, xylene resins, and alkyd resins, softeners such as phthalic esters, phosphoric esters, chlorinated paraffins, polybutene, and polyisobutylene, and various fillers and antioxidants.

For forming an optical element or the like comprising superposed and united layers, use may be made, for example, of a method which comprises forming a pressure-sensitive adhesive layer on a separator obtained by surface-treating a sheet, e.g., a film, with a release agent, transferring the adhesive layer to the bonding surface of a cholesteric liquid crystal layer, contact-bonding a quarter-wavelength plate thereto, likewise transferring another pressure-sensitive adhesive layer to the surface of the quarter-wavelength plate, and placing a polarizing plate thereon and contact-bonding the same.

Also usable are a method which comprises transferring a pressure-sensitive adhesive layer formed on a separator to the bonding surface of, e.g., a light conductive plate, placing a cholesteric liquid crystal layer thereon and contact-bonding the same, and successively contact-bonding optional optical layers, e.g., a quarter-wavelength plate and a polarizing plate, each through a pressure-sensitive adhesive layer likewise transferred to the multilayer structure, and a method which comprises superposing optical layers, e.g., a cholesteric liquid crystal layer and a quarter-wavelength plate, on each other through pressure-sensitive adhesive layers formed beforehand on given bonding surfaces and simultaneously contact-bonding the superposed layers by pressing.

The ability to absorb ultraviolet rays may be imparted to the substrate on which the cholesteric liquid crystal layer, optical element, or lighting device is to be formed according to the present invention or to other parts for use in the present invention, such as, e.g., a liquid crystal polymer layer, quarter-wavelength plate, polarizing plate, light conductive plate, adhesive layer, and other optical layers. This impartation can be accomplished, for example, by a method in which these parts are treated with an ultraviolet absorber, e.g., a salicylic ester compound, benzophenol compound, benzotriazole compound, cyanoacrylate compound, or nickel complex salt compound.

As described above, in the cholesteric liquid crystal layer and optical element according to the present invention, the polarized state of the circularly polarized light reflected by the cholesteric liquid crystal layer can be eliminated to enable the resultant light to be emitted as reusable light, when the cholesteric liquid crystal layer or optical element is used in combination with an appropriate surface light source, e.g., a side light type light conductive plate. Thus, reflection loss is eliminated. Furthermore, the emitted light is phase-controlled through a quarter-wavelength plate to convert the same into light containing a large proportion of linearly polarized light components which pass through a polarizing plate, whereby the absorption loss in the polarizing plate can be eliminated. As a result, an improvement in brightness can be attained.

As described above, the cholesteric liquid crystal layer and optical element have an excellent efficiency of light utilization, provide light which readily passes through polarizing plates, and readily cope with areal size increase, etc. Consequently, they can be advantageously used in various apparatuses, for example, as a backlight system for liquid crystal displays, etc. In this case, from the standpoint that the light which has passed through a quarter-wavelength plate is utilized as a light source, this light preferably contains at least 65%, especially at least 70%, linearly polarized light components capable of passing through a polarizing plate, such as, e.g., linearly polarized light and major-axis-direction components of elliptically polarized light.

Figure 7:
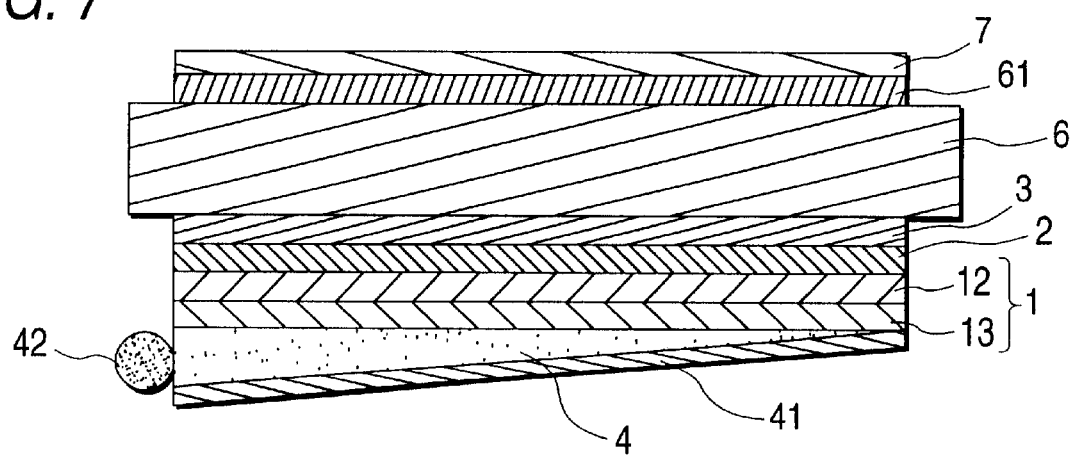
FIG. 7 is a sectional view of an example of the liquid crystal display.
Figure 8:
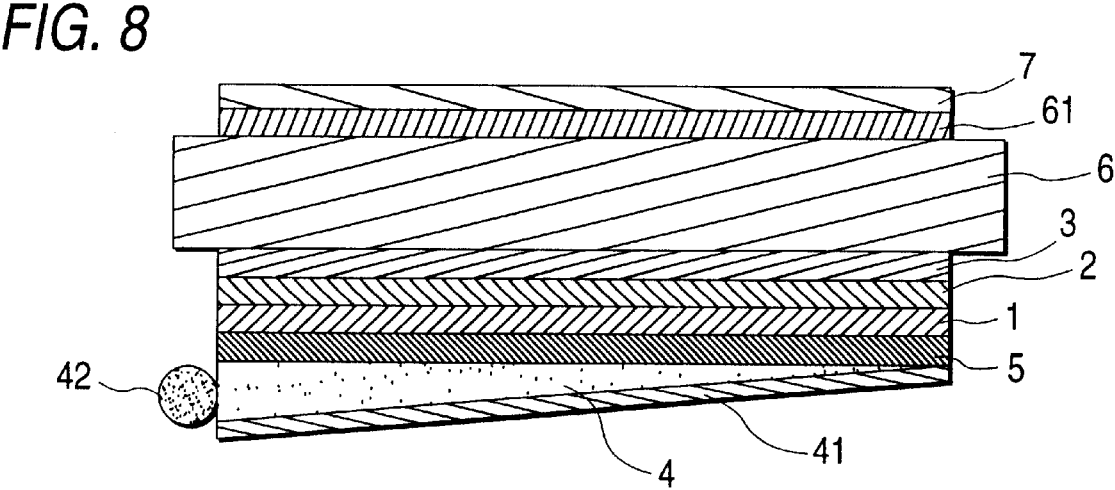
FIG. 8 is a sectional view of another example of the liquid crystal display.
Figure 9:
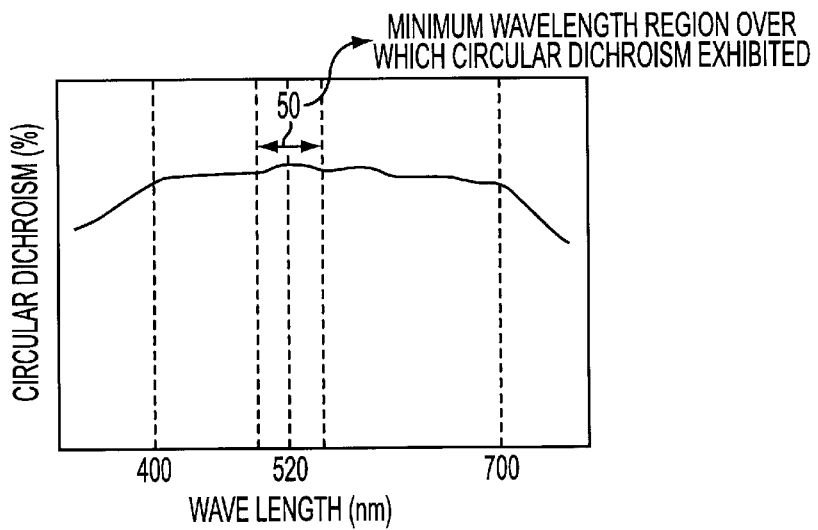
FIG. 9 is a graph depicting circular dichroism (%) versus wavelength (nm), and illustrates the concept that the minimum region over which circular dichroism is exhibited is 50 nm, and includes the wavelength of 520 nm.
Figure 10:
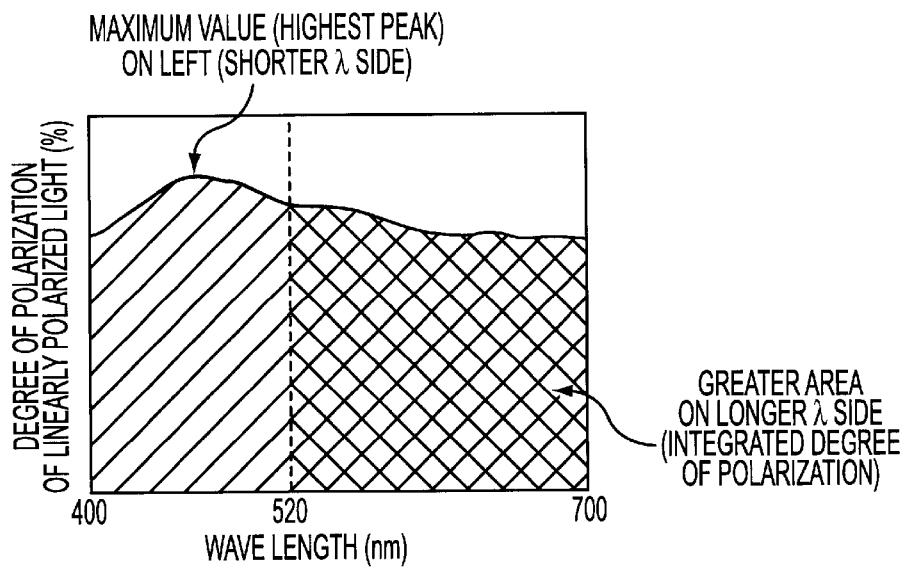
Figure 11:
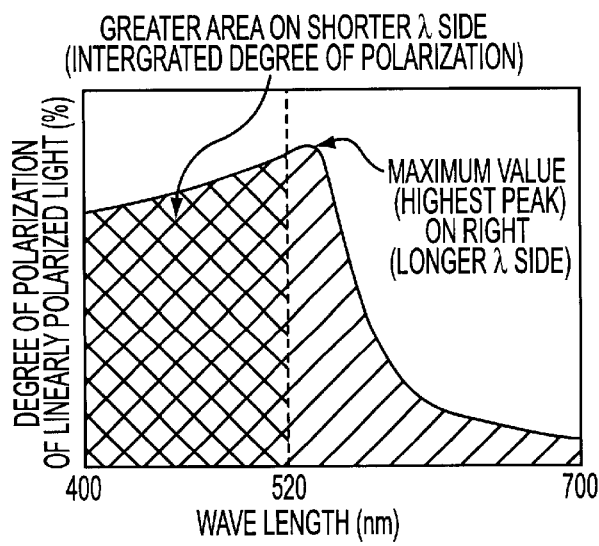
FIG. 11 is a graph illustrating the relationship between the maximum value of degree of polarization of linearly polarized light on one side of 520 nm, and the integrated degree of polarization representing the larger cross-hatched area on the opposite side of 520 nm.

Examples of a liquid crystal display employing the cholesteric liquid crystal layer, optical element, or lighting device according to the present invention are shown in FIGS. 7 and 8. The displays shown in the figures each contains an lighting device comprising a light conductive plate 4 and disposed on the light emission side thereof an optical element having a cholesteric liquid crystal layer, and further has a liquid crystal cell 6 disposed on the light emission side of the lighting device, serving as a back light. As shown in the figures, the liquid crystal cell 6 is disposed on the optical element on the side closer to the quarter-wavelength plate 2. In FIGS. 7 and 8, numeral 61 denotes a polarizing plate and 7 a light diffusing plate for diffusing the light to be viewed.

The cholesteric liquid crystal layer, optical element, and lighting device according to the present invention can be advantageously used especially for the fabrication of a liquid crystal display having polarizing plates disposed respectively on both sides of a liquid crystal cell. In the case of an optical element having a polarizing plate on the upper side of a quarter-wavelength plate, that side of the liquid crystal cell on which the optical element is to be disposed need not have a polarizing plate.

A liquid crystal display is generally fabricated, for example, by suitably assembling components including a polarizing plate, a liquid crystal cell, and a back light and optional components including a retardation compensating plate and integrating a driving circuit into the assemblage. In the present invention, a liquid crystal display can be fabricated according to a conventional method without particular limitations, except that as described above a cholesteric liquid crystal layer, optical element, or lighting device according to the present invention is disposed on that side of a liquid crystal cell which is opposite to the side from which the liquid crystal display is viewed. It is however preferred that the components have been bonded and united with each other through pressure-sensitive adhesive layers. In the case where the optical element or an lighting device having the same is used, a liquid crystal cell is disposed on that side of the optical element which is closer to the quarter-wavelength plate or polarizing plate.

The cholesteric liquid crystal layer, optical element, and lighting device according to the present invention can be advantageously used with liquid crystal cells into which polarized light should be introduced, such as those employing a twisted nematic liquid crystal or a super twisted nematic liquid crystal. However, they can be usable also with liquid crystal cells employing a non-twisted liquid crystal, a guest-host type liquid crystal containing a dichroic substance dispersed therein, or a ferroelectric liquid crystal.

In fabricating the liquid crystal display, one or more appropriate optical layers can be disposed in suitable positions according to need. For example, a light diffusing plate, anti-glare layer, antireflection film, protective layer, or protective plate may be disposed over the polarizing plate disposed on the side from which the liquid crystal display is viewed. Furthermore, a retardation compensating plate may be interposed, for example, between the liquid crystal cell and the polarizing plates disposed on the side from which the liquid crystal display is viewed or/and on the back light side.

The present invention will be explained below in more detail by reference to the following Examples, but the invention should not be construed as being limited thereto.

EXAMPLE 1

A poly(vinyl alcohol) layer having a thickness of 0.1 $\mu$m was formed on a 50 $\mu$m-thick cellulose triacetate film showing no birefringence. The poly(vinyl alcohol) layer was rubbed with a rayon cloth to form an oriented film. A 20 wt % tetrahydrofuran solution of a thermotropic cholesteric liquid crystal acrylic polymer was applied on the oriented film with a wire-wound bar and then dried. Thereafter, the liquid crystal polymer was aligned by heating at 150±2° C. for 5 minutes and then allowed to cool at room temperature to thereby form a cholesteric liquid crystal polymer layer having a thickness of 1.5 µm. In the above manner, four cholesteric liquid crystal polymer layers specularly reflecting right-hand circularly polarized light were obtained which showed circular dichroism in wavelength regions of (A) from 750 to 850 nm, (B) from 450 to 550 nm, (C) from 600 to 700 nm, and (D) from 750 to 850 nm, respectively.

Subsequently, the cholesteric liquid crystal polymer layers (A) and (B) were superposed on each other so that the liquid crystal sides met each other, and the superposed liquid crystal layers were contact-bonded to each other with heating at 150±2° C. for 2 minutes. The cellulose triacetate film on the layer (B) side was then peeled off. The cholesteric liquid crystal polymer layer (C) was superposed on the exposed liquid crystal polymer layer so that the liquid crystal sides met each other. Contact bonding was conducted with heating at 150±2° C. for 2 minutes. Thereafter, the cholesteric liquid crystal polymer layer (D) was contact-bonded with heating in the same manner. Thus, a cholesteric liquid crystal layer was obtained in which the helical pitch changed in the thickness direction and which showed circular dichroism throughout a wavelength region of from 400 to 800 nm.

Subsequently, a quarter-wavelength plate having an Nz of −1.5 and comprising a stretched polycarbonate film having a retardation of 140 nm was superposed through an acrylic pressure-sensitive adhesive layer on the above cholesteric liquid crystal layer on its side having a longer helical pitch. Thus, an optical element was obtained.

EXAMPLE 2

An optical element was obtained in the same manner as in Example 1, except that the quarter-wavelength plate was superposed on the longer-helical pitch side of the cholesteric liquid crystal layer.

Comparative Example 1

An optical element was obtained in the same manner as in Example 1, except that a quarter-wavelength plate having an Nz of 1 was used.

Comparative Example 2

In the same manner as in Example 1, four cholesteric liquid crystal polymer layers each having a thickness of 1.5 µm and specularly reflecting right circularly polarized light were obtained which showed circular dichroism in wavelength regions of (E) from 350 to 450 nm, (F) from 450 to 550 nm, (G) from 550 to 650 nm, and (H) from 650 to 750 nm, respectively. The cholesteric liquid crystal polymer layers (G) and (H) were superposed on each other so that the liquid crystal sides met each other, and the superposed liquid crystal layers were contact-bonded to each other with heating at 150±2° C. for 2 minutes. The cellulose triacetate film on the layer (G) side was then peeled off. The cholesteric liquid crystal polymer layer (F) was superposed on the exposed liquid crystal polymer layer so that the liquid crystal sides met each other. Contact bonding was conducted with heating at 150±2° C. for 2 minutes. Thereafter, the cholesteric liquid crystal polymer layer (E) was further contact-bonded with heating in the same manner. Thus, a cholesteric liquid crystal layer was obtained in which the helical pitch changed in the thickness direction and which showed circular dichroism throughout a wavelength region of from 400 to 700 nm. A quarter-wavelength plate having an Nz of −1.5 was superposed on the above cholesteric liquid crystal layer on its side having a longer helical pitch in the same manner as in Example 1. Thus, an optical element was obtained.

Evaluation Tests

Degree of Polarization

Polarized light obtained with a Glan-Thompson prism was passed through each of the optical elements obtained in the Examples and Comparative Examples to examine these elements for $T_{max}$ and $T_{min}$. The degree of polarization for each element was calculated from these values using the following equation.

$$\text{Degree of polarization } (\%) = (T_{max} - T_{min})/(T_{max} + T_{min}) \times 100$$

Brightness Improvement

Each of the optical elements obtained in the Examples and Comparative Examples was interposed between a commercial side light type surface light source comprising a light conductive plate bearing a printed dot pattern on the back side and a polarizing plate, in such a manner that the quarter-wavelength plate met the polarizing plate. Each resultant lighting device was examined for brightness. The proportion of this found brightness value to the brightness value for the case where no optical element was disposed was determined, with the latter brightness value being taken as 100.

Viewing Angle Characteristics

Lighting devices were fabricated in the same manner as in the above brightness improvement test. Each lighting device was viewed while changing the viewing angle from the front direction to a slant direction forming an angle of 45° with the front direction, and visually examined for color change. The lighting devices were evaluated in five grades, ranging from "5" indicating an lighting device in which no color change was observed to "1" indicating an lighting device which showed a considerable color change.

The results of the above evaluations are shown in the following table.

|  | Degree of polarization (%) | | | Brightness Improvement | Viewing Angle Characteristics |
| --- | --- | --- | --- | --- | --- |
|  | Light with Wavelength of 470 nm | Light with wavelength of 550 nm | Light with Wavelength of 600 nm | | |
| Example 1 | 93 | 80 | 77 | 155 | 5 |
| Example 2 | 90 | 80 | 85 | 154 | 4 |
| Comparative Example 1 | 93 | 80 | 77 | 155 | 2 |
| Comparative Example 2 | 80 | 82 | 92 | 152 | 1 |

While the invention has been described in detail and with reference to specific embodiments thereof, it will be apparent to one skilled in the art that various changes and modifications can be made therein without departing from the spirit and scope thereof.

What is claimed is:

1. A cholesteric liquid crystal layer having Grandjean orientation in which a helical pitch changes in the thickness direction, wherein circular dichroism by which natural light is separated into reflected light comprising circularly polarized light and transmitted light is exhibited over a wavelength region having a width of at least 50 nm and including a wavelength of 520 nm, said cholesteric liquid crystal layer showing either (a) polarization characterizations such that when the reflected light or the transmitted light is converted to linearly polarized light through a quarter-wavelength plate, then the linearly polarized light in the visible light region has a maximum value of degree of polarization at a wavelength of 520 nm or shorter, or (b) polarization characteristics such that when the degree of polarization of the linearly polarized light in the visible light region is integrated in the wavelength region where the circular dichroism is exhibited, then the integrated degree of polarization for the region on the shorter-wavelength side of 520 nm is greater than that for the region on the longer-wavelength side of 520 nm.

2. The cholesteric liquid crystal layer of claim 1, wherein the wavelength region where the circular dichroism is exhibited include the visible light region of from 400 to 700 nm, and the linearly polarized light obtained through the quarter-wavelength plate has, in a monochromatic or shorter-wavelength visible region of from 520 nm to a shorter wavelength, the degree of polarization higher by from 2 to 40% than in a monochromatic or longer-wavelength visible region of more than 520 nm.

3. An optical element comprising a multilayer structure comprising the cholesteric liquid crystal layer of claim 1 or 2, and at least one optical layer superposed thereon, said optical layer being a retardation compensating plate, a polarizing plate, a light conductive plate, or the quarter-wavelength plate which comprises one or more retardation layers including a retardation layer having a value of Nz defined by the equation $(n_x-n_z)/(n_z-n_y)=Nz$ of from $-0.8$ to $-2.0$, wherein $n_x$ is the maximum in-plane refractive index, $n_y$ is the refractive index in a direction perpendicular to the $n_x$ direction, and $n_z$ is the thickness-direction refractive index.

4. The optical element of claim 3, wherein the quarter-wavelength plate is disposed on a shorter-helical pitch side of the cholesteric crystal liquid layer.

5. A lighting device comprising a surface light source and having disposed thereover the cholesteric liquid crystal layer of claim 1 or 2.

6. A liquid crystal display comprising a liquid crystal cell and having disposed on one side thereof the cholesteric liquid crystal layer of claim 1 or 2.

7. A liquid crystal display comprising the lighting device of claim 5 and a liquid crystal cell disposed on the light emission side thereof.

8. A lighting device comprising a surface light source having disposed thereover the optical element of claim 3.

9. A lighting device comprising a surface light source having disposed thereover the optical element of claim 4.

10. A liquid crystal display comprising a liquid crystal cell and having disposed on one side thereof the optical element of claim 3.

11. A liquid crystal display comprising a liquid crystal cell and having disposed on one side thereof the optical element of claim 4.

12. A liquid crystal display comprising the lighting device of claim 8 and a liquid crystal cell disposed on the light emission side thereof.

13. A liquid crystal display comprising the lighting device of claim 9 and a liquid crystal cell disposed on the light emission side thereof.

* * * * *